(12) United States Patent
Dwivedi et al.

(10) Patent No.: US 10,949,604 B1
(45) Date of Patent: Mar. 16, 2021

(54) IDENTIFYING ARTIFACTS IN DIGITAL DOCUMENTS

(71) Applicant: Adobe Inc., San Jose, CA (US)

(72) Inventors: Uttam Dwivedi, Noida (IN); Mohit Gupta, Noida (IN); Ashutosh Mehra, Noida (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/664,335

(22) Filed: Oct. 25, 2019

(51) Int. Cl.
*G06F 17/00* (2019.01)
*G06F 40/114* (2020.01)
*G06K 9/00* (2006.01)

(52) U.S. Cl.
CPC ........ *G06F 40/114* (2020.01); *G06K 9/00456* (2013.01); *G06K 9/00463* (2013.01)

(58) Field of Classification Search
CPC ...... G06F 40/114; G06F 16/986; G06F 40/14; G06K 9/00456; G06K 9/00463; G06K 9/00449; G06K 9/325
USPC ....................................................... 715/229
See application file for complete search history.

(56) References Cited

U.S. PATENT DOCUMENTS

| | | | |
|---|---|---|---|
| 10,013,488 B1 * | 7/2018 | Zhao | G06F 16/7335 |
| 10,042,880 B1 | 8/2018 | Bodapati et al. | |
| 10,108,695 B1 | 10/2018 | Yeturu et al. | |
| 2003/0229854 A1 * | 12/2003 | Lemay | G06F 16/345 |
| | | | 715/227 |
| 2004/0006742 A1 | 1/2004 | Slocombe | |
| 2007/0043707 A1 * | 2/2007 | Kulkarni | G06F 16/95 |
| 2007/0237428 A1 * | 10/2007 | Goodwin | G06K 9/00442 |
| | | | 382/309 |
| 2008/0114757 A1 * | 5/2008 | Dejean | G06F 16/258 |
| 2011/0044539 A1 | 2/2011 | Kimura et al. | |
| 2011/0055209 A1 | 3/2011 | Novac et al. | |
| 2012/0297025 A1 * | 11/2012 | Zeng | G06F 16/951 |
| | | | 709/217 |
| 2013/0124513 A1 * | 5/2013 | Bignert | G06F 16/353 |
| | | | 707/728 |
| 2013/0191366 A1 * | 7/2013 | Jovanovic | G06K 9/00469 |
| | | | 707/710 |
| 2013/0283148 A1 * | 10/2013 | Lim | G06F 16/986 |
| | | | 715/234 |
| 2014/0208192 A1 * | 7/2014 | Zaric | G06F 40/20 |
| | | | 715/205 |
| 2016/0132219 A1 * | 5/2016 | Shaw | G06F 3/0483 |
| | | | 715/779 |

(Continued)

OTHER PUBLICATIONS

"Notice of Allowance", U.S. Appl. No. 16/597,318, dated Jan. 7, 2021, 21 pages.

(Continued)

*Primary Examiner* — Jason T Edwards
(74) *Attorney, Agent, or Firm* — FIG. 1 Patents

(57) ABSTRACT

Techniques described herein implement identifying artifacts in digital documents in a digital medium environment. A document analysis system is leveraged to extract page features from a digital document and to determine whether certain page features represent page artifacts such as headers and footers. Those page features determined to be page artifacts can be extracted from the digital document to generate a reflowed version of the digital document that preserves primary content. The primary content, for instance, is rearranged in the reflowed document to compensate for the extracted page artifacts.

20 Claims, 10 Drawing Sheets

(56) References Cited

U.S. PATENT DOCUMENTS

| | | |
|---|---|---|
| 2016/0364608 A1 | 12/2016 | Sengupta et al. |
| 2018/0129944 A1* | 5/2018 | Meunier ................ G06N 20/00 |
| 2018/0129989 A1 | 5/2018 | Bowers |
| 2018/0336404 A1* | 11/2018 | Hosabettu .............. G06K 9/325 |
| 2019/0073528 A1 | 3/2019 | Agarwalla et al. |
| 2019/0138509 A1* | 5/2019 | von Rickenbach .......................... G06F 11/0793 |
| 2019/0197483 A1* | 6/2019 | Li ............................. G06F 7/14 |
| 2020/0034611 A1* | 1/2020 | Hosabettu .......... G06K 9/00463 |
| 2020/0272788 A1 | 8/2020 | Sanderson |
| 2020/0311571 A1 | 10/2020 | Bellert |

OTHER PUBLICATIONS

"Pre-Interview First Office Action", U.S. Appl. No. 16/597,318, dated Nov. 5, 2020, 5 pages.

\* cited by examiner

IDENTIFYING ARTIFACTS IN DIGITAL DOCUMENTS

BACKGROUND

Document analytics systems are implemented to analyze digital documents and determine attributes of digital documents that are not practically determined, solely, by human users. Document attributes such as structural features, for example, may not be identified in the document itself due to limitations of the document format, and/or because a document author did not identify the attributes at the point of document creation. For instance, consider documents such as Portable Document Format (PDF) documents. A typical document analytics system can perform an optical scan of a PDF document to produce a digitized version of the image-based digital document. Such digitized versions, however, do not typically label higher-order document structures, such as headers, footers, siders, and other structural features.

Further, other document types (e.g., Word documents) may not explicitly label hierarchical structural features. For instance, a document creator may utilize character formatting (e.g., tab adjustment, font size, bolding, and so forth) to create an implied document structure without actually labeling different structural features. Accordingly, since conventional document analytics systems are unable to categorize such higher-order features from digital documents this prevents such systems from generating digitized versions of digital documents that can be accurately rearranged into different forms while preserving the semantic integrity of such higher-order features.

For instance, consider a scenario where a digital document that is created on a large form factor device such as a desktop computer is to be reflowed and displayed on a small form-factor device such as a smartphone. To enable the digital document to be properly reformatted for display on the small device, some structural features in the digital document would likely need to be recognized such that the structural and/or semantic integrity of the digital document is preserved when the digital document is reformatted. Since conventional document analytics systems are typically unable to recognize such structural features, these systems would likely be unable to properly reformat the digital document in a way that preserves the integrity of the features. This may result in a conventional document analysis system generating a reformatted version of a digital document that fails to preserve a visual and/or logical arrangement of its higher-order features, and/or that is logically undecipherable by a viewing user. Further, manual (e.g., user-implemented) approaches to reformatting digital documents are unfeasible for large digital documents and collections of digital documents, and such scenarios require a tremendous expenditure of time and computer resources.

Thus, conventional document analytics systems are unable to recognize and categorize higher-order features from digital documents. Further, due to the sheer volume of content in digital documents and collections of digital documents, user-implemented manual categorization and reformatting of digital documents is infeasible. As a result, conventional ways for digitizing and reformatting digital documents typically cannot be utilized to provide reformatted versions of digital documents that preserve the semantic and structural integrity of the digital documents.

SUMMARY

Techniques described herein implement identifying artifacts in digital documents in a digital medium environment. A document analysis system is leveraged to extract page features from a digital document and to determine whether certain page features represent page artifacts such as headers, footers, and siders. Those page features determined to be page artifacts can be extracted from the digital document to generate a reflowed version of the digital document that preserves primary content of the digital document. The primary content, for instance, is rearranged in the reflowed document to compensate for the extracted page artifacts.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

DETAILED DESCRIPTION

Overview

Figure 1:
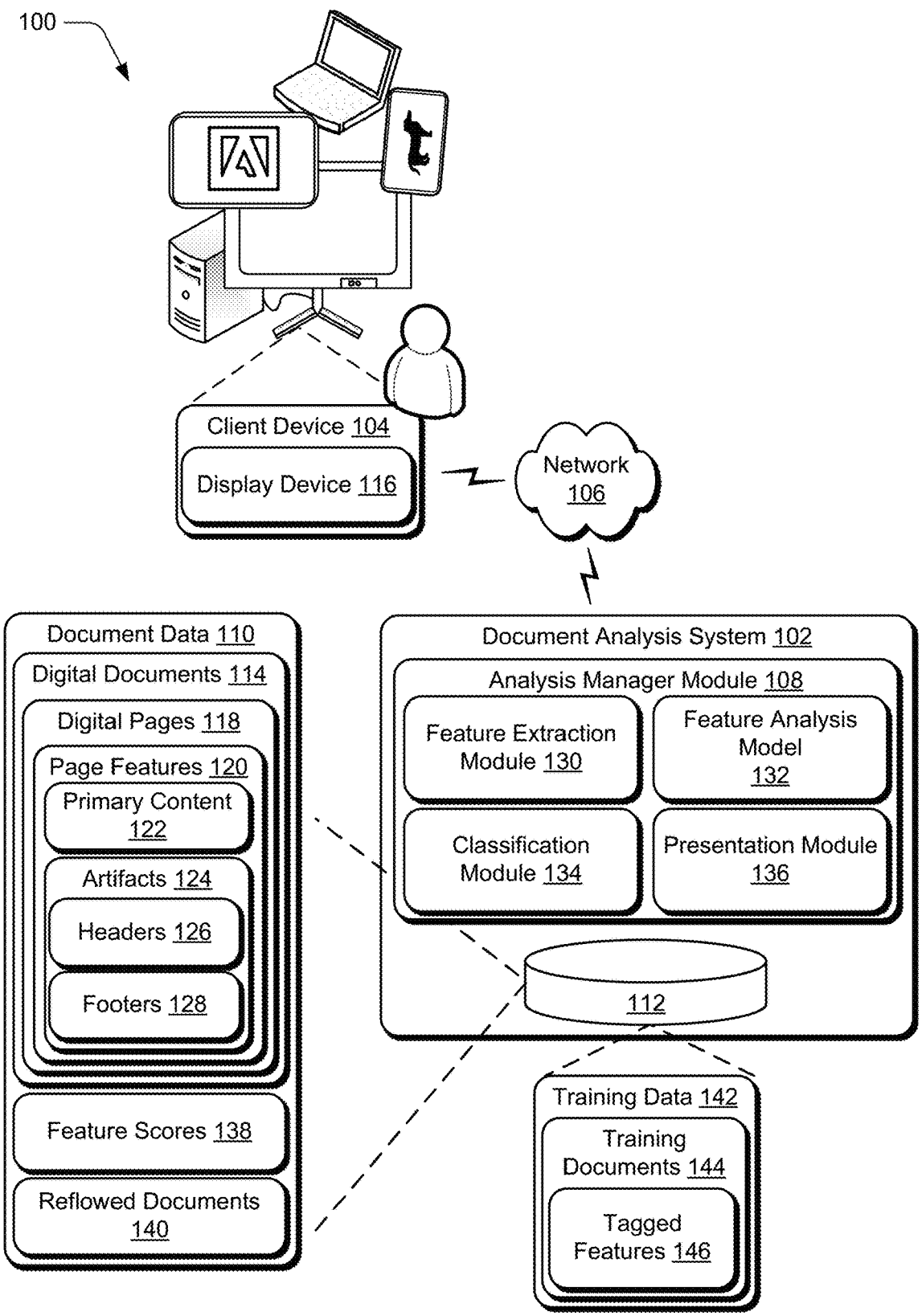
FIG. 1 is an illustration of an environment in an example implementation that is operable to employ techniques described herein.

To overcome the challenges to document feature classification presented in typical document analytics systems, identifying artifacts in digital documents is leveraged in a digital medium environment. For instance, a document analysis system receives a digital document for processing, such as based on a request to generate a reflowed version of the digital document. Generally, pages of the digital document include various types of page features, including primary content and page artifacts. The primary content represents authored content that is the primary focus of the digital document, such as text blocks, images, headings, and so forth. The page artifacts represent pagination features such as headers, footers, page numbers, corporate logos, and so forth. Further to the described techniques, a feature extraction module extracts the page features from the digital document to obtain the unclassified page features, such as via an optical scan or other computer vision technique. As part of extracting the page features, the feature extraction module determines position information that describes a position of each of the page features in the digital document, as well as different visual attributes of the page features.

The document analysis system then utilizes the extracted page features to perform a feature analysis to ascertain a likelihood that each page feature represents a page artifact of the digital document. To do this, the page features are input to a feature analysis model, which processes individual page features and outputs, for individual page features, a feature score representing a probability that the page feature represents a page artifact. For instance, the higher a feature score, the more likely that a particular page feature represents an instance of a page artifact.

A classification module then takes the page features and sorts the page features into different groups based on their respective feature scores. For instance, the classification module utilizes different likelihood thresholds to identify a set of high confidence features, mid confidence features, and low confidence features. Generally, the high confidence features represent page features that are most likely to be page artifacts. Based on the high confidence features, the classification module defines an artifact region that represents a portion of pages of the digital document. The artifact region, for instance, is defined to correspond to a position of a particular high confidence feature on a page of the digital document. The classification module then searches pages of the digital document for page features (e.g., high confidence features and mid confidence features) that coincide positionally with the artifact region, which the classification module labels as page artifacts.

After the page artifacts are identified, a reflowed version of the digital document can be generated by extracting the page artifacts from the digital document while preserving primary content of the digital document. For instance, a presentation module removes the page artifacts from the digital document, and rearranges the primary content to account for the removed artifacts. The primary content, for example, is rearranged such that gaps introduced based on artifact removal are minimized. Further, primary content separated by a removed artifact (e.g., content continued across a page boundary) can be merged together to provide a seamless content experience. Thus, a reflowed document is generated that omits page artifacts and enables primary content to be presented in a visually cohesive way. In at least some implementations, this enables a digital document to be adapted for various device types, such as to generate a reflowed document that can be presented on a mobile device while preserving the semantic context of the primary content from the original digital document.

Accordingly, techniques for identifying artifacts in digital documents overcome the deficiencies of traditional ways for digital document analysis. For instance, the innovative techniques accurately identify and label page artifacts of digital documents without requiring user intervention to specify or validate the identified artifacts. Further, based on the identified page artifacts, modified versions of digital documents can be generated that extract the identified artifacts while preserving primary document content. In this way, accurate classification of page artifacts of digital documents can be leveraged to reduce inaccuracies and resource wastage experienced in conventional document analysis systems.

Term Descriptions

These term descriptions are provided for purposes of example only and are not intended to be construed as limiting on the scope of the claims.

As used herein, the term "digital document" refers to digital collections of digital content, such as digital text and digital images. Examples of digital documents include Portable Document Format (PDF) documents, editable digital text documents, digital image documents (e.g., Tagged Image File Format (TIFF) files), and so forth. In at least some implementations, a digital document is implemented as an image-based digital document that does not include editable text or other editable visual features.

As used herein, the term "page feature" refers to visual elements of digital documents, such as visual structures that make up pages of a digital document. Generally, a particular digital document can be characterized as a set of page features that are arranged in a particular way to generate the visual appearance of the particular digital document. Examples of page features include text blocks, headings, Tillable form fields, selectable options, lists, list items, bullets and bulleted items, headers, footers, siders, page numbers, and so forth. As further described below, page features can be classified as primary content and page artifacts.

As used herein, the term "primary content" refers to content of a digital document that is authored and that represents the focus of the digital document. Primary content, for instance, includes headings, text blocks, images, and so forth, that present informational narratives and that are arranged in a serial and primarily non-repeating way to convey some type of contextual meaning.

As used herein, the term "page artifact" refers to various visual aspects of a digital document that are typically presented with some sort of repetition and that are presented at the periphery of primary content, such as at the topmost, bottommost, and/or sidemost regions of digital pages. Page artifacts, for example, are often added to a paginated document to support the notion of a paginated medium. Examples of page artifacts include headers, footers, siders, page numbers, corporate logos, and so forth.

As used herein, the term "reflowed document" refers to a reflowed version of a digital document that is generated by implementing a computer-executed function (e.g., a computer-executed process and/or action) of identifying page artifacts of the digital document, extracting the page artifacts, and rearranging primary content of the digital document to account for the removed artifacts. In at least some implementations, a reflowed document can be generated for a specific device, such as based on display and processing capabilities of the device. For instance, for a small form factor device such as a mobile phone, a digital document can be reflowed to generate a reflowed document that can be displayed on the device with page artifacts removed and primary content adapted for optimal visual presentation on the device.

In the following discussion, an example environment is first described that may employ the techniques described herein. Example systems, implementations, and procedures are then described which may be performed in the example environment as well as other environments. Performance of the example procedures is not limited to the example environment and the example environment is not limited to performance of the example procedures. Finally, an example system and device are described that are representative of one or more computing systems and/or devices that may implement the various techniques described herein.

Example Environment

FIG. 1 is an illustration of an environment 100 in an example implementation that is operable to employ identifying artifacts in digital documents as described herein. The illustrated environment 100 includes a document analysis system 102 and a client device 104 that are communicatively coupled, one to another, via a network 106.

Computing devices that are usable to implement the document analysis system 102 and the client device 104 may be configured in a variety of ways, such as a desktop computer, a laptop computer, a mobile device (e.g., assuming a handheld configuration such as a tablet or mobile phone), and so forth. Further, such devices may be representative of a plurality of different devices, such as multiple servers utilized by an enterprise to perform operations "over the cloud" as further described in relation to FIG. 10.

The document analysis system 102 includes an analysis manager module 108 that is representative of functionality to analyze and categorize structural features of digital documents further to techniques for identifying artifacts in digital documents described herein. As part of enabling the analysis manager module 108 to perform such analyses and categorization, the document analysis system 102 maintains document data 110 on a data storage 112. The document data 110 includes digital documents 114, which represent different instances of electronic digital content that can be output in various ways and in various forms, such as via display on a display device 116 of the client device 104. Examples of the digital documents 114 include digital forms, digital publications, digital text documents, and so forth. In at least some implementations, the digital documents 114 include image-based digital documents, such as PDF documents. An image-based digital document, for example, represents a digital document with content encoded as images, in contrast with other types of digital documents that may include machine-encoded text and other types of machine-encoded content.

The digital documents 114 include digital pages 118 which in turn include page features 120. The digital pages 118 are representative of divisions of the digital document analogous to pages of a physical document such as a book. Generally, the page features 120 represent visual elements of digital documents 114, such as visual structures that reside on different digital pages 118. For instance, a particular digital page 118 of a digital document 114 can be characterized as a set of page features 120 that are arranged to generate the visual appearance of the particular digital page 118. The page features 120 include primary content 122 and page artifacts 124. Generally, the primary content 122 represents content that occupies the main portion of each of the digital pages 118, such as body content including headings, text blocks, form fields, digital images, lists, tables, and so forth. In at least some implementations, the primary content 122 represents content that is non-repeating among the different digital pages 118. For instance, in at least some of the digital documents 114, each digital page 118 includes a set of primary content 122 that is unique to each respective digital page 118.

The page artifacts 124 represent page features 120 that are not primary content 122 and that in at least some implementations occupy the topmost, bottommost, and/or sidemost portions of the digital pages 118. As referenced previously, page artifacts are typically included to support a paginated medium, such as for providing context (e.g., what page and/or chapter is being presented), as an anchor to other portions of a document (e.g., when combined with a table of contents), as a way of inter-document referencing (e.g., to other pages of a digital document), and so forth. The page artifacts 124 include headers 126 and footers 128. The headers 126 represent content, such as text, characters, images, and so forth, that is separated from body content of the digital documents 114 and that appears at the top of a page of the digital documents 114. Similarly, the footers 128 represent content, such as text, characters, images, and so forth, that is separated from body content of the digital documents 114 and that appears at the bottom of a page of the digital documents 114. The page artifacts 124 may include other types of artifacts, one example of which are identified as "siders." Generally, a sider represents an artifact that appears at the rightmost and/or leftmost edge or side of a digital page, such as a page number, chapter number, chapter name, and so forth, e.g., the same type of content that can occur in a header and/or footer. Siders, for instance, sometime are included in a reference manual where different sections are numbered and/or labeled differently to provide a way to "thumb" through the manual. Accordingly, the terms "header" and/or "footer" as used herein may additionally or alternatively refer to a sider.

Further to techniques for identifying artifacts in digital documents, the analysis manager module 108 includes a feature extraction module 130, a feature analysis model 132, a classification module 134, and a presentation module 136. The feature extraction module 130 is representative of functionality to analyze and extract different features of the digital documents 114, such as the page features 120. In at least one implementation, the feature extraction module 130 utilizes computer vision processes to analyze and extract the page features 120 from the digital documents 114. The feature analysis model 132 represents a machine learning model (or set of models) that takes the page features 120 as input, and generates feature scores 138 that represent confidence values that quantify a likelihood that each of the page features 120 represents an instance of a page artifact 124. In at least one implementation, for example, the higher the feature score 138 for a particular page feature 120, the more likely the page feature 120 represents a page artifact 124.

The classification module 134 represents functionality for processing the page features 120 based on their feature scores 138 to determine whether to classify instances of the page features 120 as page artifacts 124. The presentation module 136 represents functionality for generating and outputting reflowed documents 140 based on the identified page artifacts 124. Generally, the reflowed documents 140 represent versions of the digital documents 114 that are modified by removing some or all of the page artifacts 124 such that the primary content 122 is presented without the page artifacts 124.

To enable the feature analysis model 132 to generate the feature scores 138, the document analysis system 102 maintains training data 142 stored on the storage 112. Generally, the training data 142 can be utilized by the analysis manager module 108 to train the feature analysis model 132 prior to processing the page features 120. The training data 142, for instance, includes training digital documents ("training documents") 144, which include tagged page features ("tagged features") 146. The tagged features 146, for instance, are generated by processing (e.g., manually) the training documents 144 and applying tags to the tagged features 146 that identify which category each tagged feature 146 belongs to. The tagged features 146, for instance, indicate whether individual features of the training documents 144 are artifacts or are other types of page features, e.g., that a particular page feature is an artifact or is not an artifact. For those page features of the training documents 146 categorized as artifacts, the tagged features 146 further indicate what type of artifact they are, e.g., a header, a footer, a page number, a logo, and so forth. The tagged features 146 can then be used to train the feature analysis model 132 to categorize the page features 120 of the digital documents 114.

According to implementations for identifying artifacts in digital documents, the analysis manager module 108 can configure the feature analysis model 132 using any type of machine-learning technique to enable classification of structural feature categories as described herein. Further, such a machine-learning model uses one or more of supervised learning, unsupervised learning, or reinforcement learning. For example, the machine-learning model can include, but is not limited to, decision trees, support vector machines, linear regression, logistic regression, Bayesian networks, random forest learning, dimensionality reduction algorithms, boosting algorithms, artificial neural networks (e.g., fully-connected neural networks, convolutional neural networks, or recurrent neural networks), deep learning, or combinations thereof.

Having considered an example environment, consider now a discussion of some example details of the techniques for identifying artifacts in digital documents in a digital medium environment in accordance with one or more implementations.

Implementation Scenarios

Figure 2:
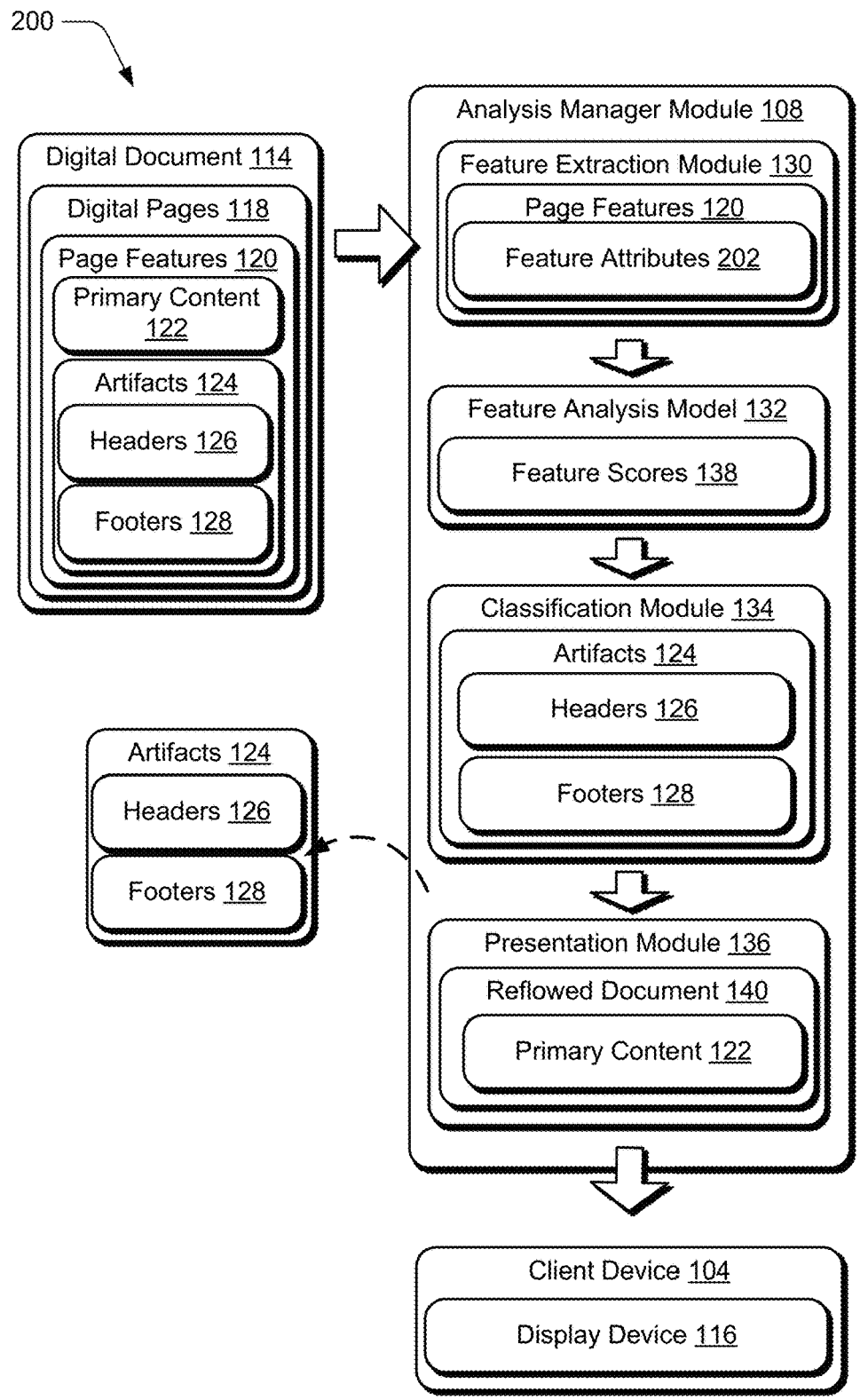
FIG. 2 depicts an example system that represents an overview of processes for identifying artifacts in digital documents.

FIG. 2 depicts an example system 200 that represents an overview of processes for identifying artifacts in digital documents in accordance with various implementations. In the system 200, the analysis manager module 108 receives a digital document 114 with digital pages 118, and the feature extraction module 130 processes the digital document 114 to extract page features 120 from the digital pages 118. As referenced above, the feature extraction module 130 can utilize computer vision techniques to analyze visual aspects of the digital pages 118 and extract the page features 120. As part of extracting the page features 120, the feature extraction module 130 also determines feature attributes 202 for each of the page features 120. Examples of the feature attributes 202 include bounding box size information for page features 120 (e.g., width and length) and page position information for page features 120. Page position information, for example, includes page coordinates (e.g., x and y) for individual page features 120 relative to a digital page 118 on with the page features 120 reside, and in at least one implementation may be specified as bounding box coordinates. The feature attributes 202 may include other types of data regarding the page features 120, such as font attributes of text characters (e.g., size and styling) and vector representations of the page features 120.

The feature analysis model 132 then takes the digital pages 118, the page features 120, and the feature attributes 202 as input and generates feature scores 138 for each of the page features 120. In taking the digital pages 118 as input, for example, the feature analysis model 132 takes rendered versions of the digital pages 118 as input, e.g., versions of the digital pages 118 that would be rendered for visual output. Generally, each feature score 138 indicates a likelihood that a respective page feature 120 represents an artifacts. The feature scores 138, for instance, identify each of the individual page features 120, and a respective score for each page feature 120. In at least one implementation, the feature scores are based on a floating point scale of 0→1, with 0 indicating a very low likelihood that a particular page feature represents an artifact, and a score of 1 indicating a very high likelihood that a respective page feature represents an artifact.

The classification module 134 takes the feature scores 138 and the page features 120 as input, and processes them to identify the page artifacts 124, which include headers 126 and/or footers 128. Based on the identified page artifacts 124, the presentation module 136 generates a reflowed document 140 that represents a version of the digital document 114 that is transformed by removing the page artifacts 124 and preserving the primary content 122. In at least one implementation, removing the page artifacts 124 may introduce empty spaces within the digital document 114, and thus the primary content 122 can be shifted positionally to reduce and/or remove such empty spaces. The presentation module 136 causes the reflowed document 140 to be available for output by the client device 104, such as for display by the display device 116.

Figure 3:
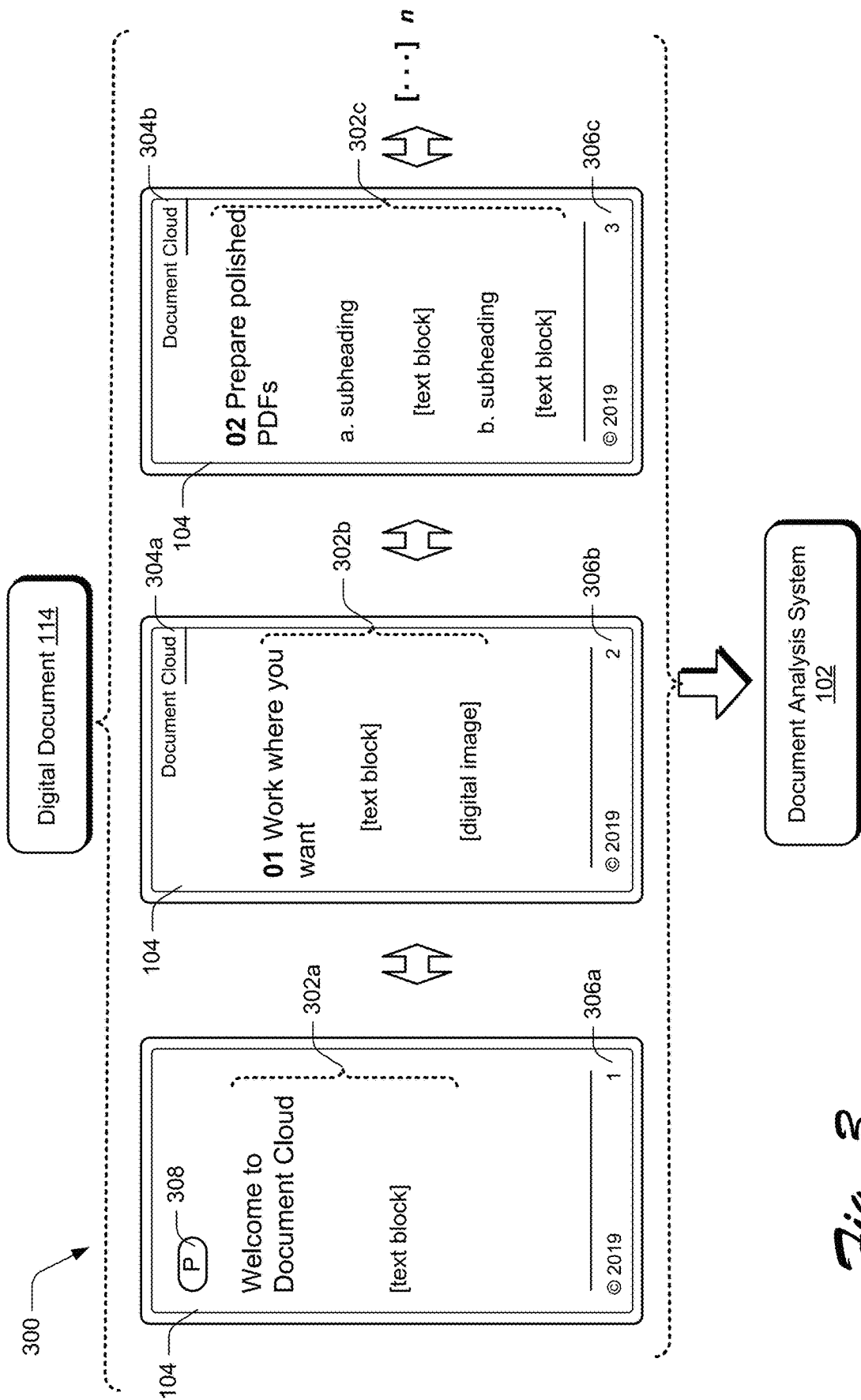
FIG. 3 depicts an implementation scenario for initiating a process for reflowing a digital document.
Figure 4:
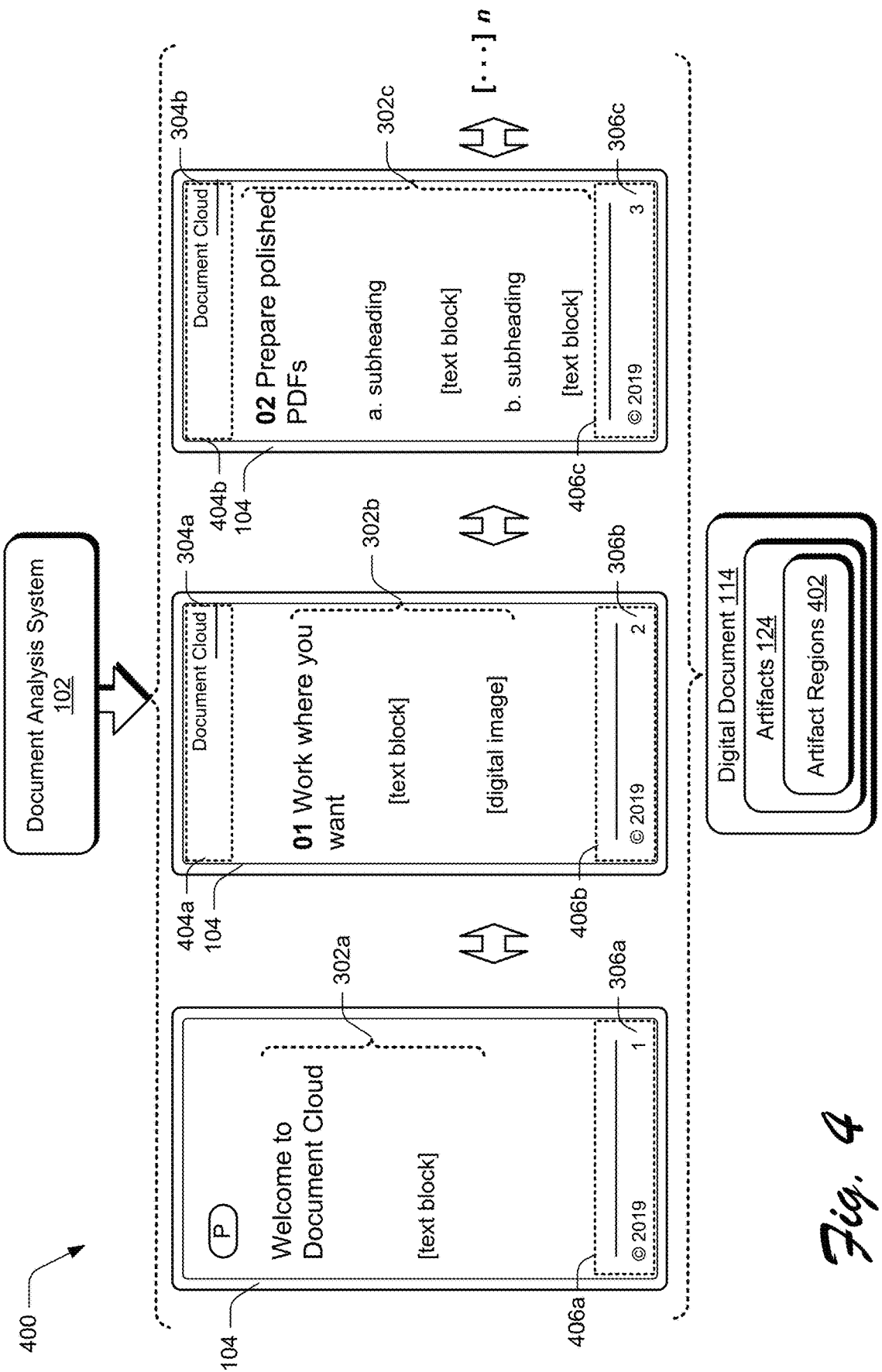
FIG. 4 depicts a scenario for recognizing page artifacts in a digital document.
Figure 5:
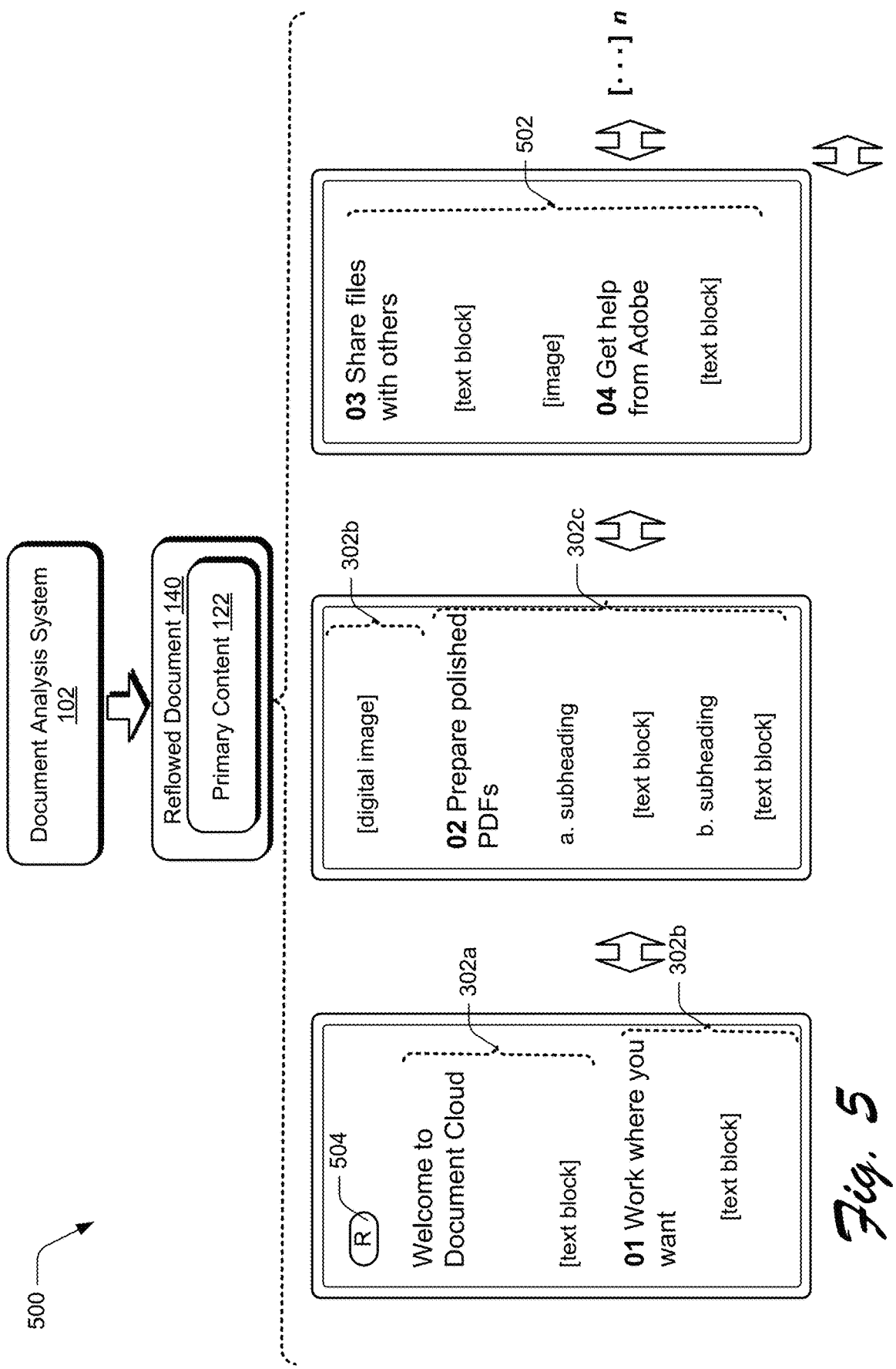
FIG. 5 depicts a scenario for generating and displaying a reflowed document.

FIGS. 3-5 depict example aspects of an implementation scenario for identifying artifacts in digital documents. For instance, FIG. 3 depicts an implementation scenario 300 for initiating a process for reflowing a digital document. The scenario 300 includes different pages of the digital document 114 displayed on the client device 104, as shown via the different page numbers "1-n." Further, pages of the digital document 114 include different page features 120, including primary content 302a, 302b, 302c; headers 304a, 304b; and footers 306a, 306b, 306c. In this particular example, the different portions of primary content 302a-302c including different sections of text, digital images, and so forth, that each represent different content and/or different arrangements of content. The headers 304a, 304b include repeating content (e.g., the same content) on each of the digital pages. Further, the footers 306a-306c include some repeating content (e.g., "© 2019"), and some different content, i.e., the sequential page numbers of the digital pages 118.

Continuing with the scenario 300, the digital document 114 is input to the document analysis system 102, which initiates a process for reflowing the digital document 114. In at least one implementation, a user selects a process control 308, which causes the document analysis system 102 to initiate the reflow process.

FIG. 4 depicts a scenario 400 for recognizing page artifacts 124 in the digital document 114. The scenario 400, for instance, represents a continuation of the scenario 300. In the scenario 400, the document analysis system 102 processes the digital document 114 to recognize instances of page artifacts 124 on the different digital pages of the digital document 114. In this case, the document analysis system 102 recognizes the headers 304a, 304b and the footers 306a-306c, which represents instances of the headers 126 and the footers 128, respectively. Further, the document analysis system 102 associates different artifact regions 402 with the different artifacts, which are depicted as boxes (e.g., bounding boxes) outlined in dotted lines. For instance, the headers 304a, 304b are associated with artifact regions 404a, 404b, respectively. Further, the footers 306a-306c are associated with artifact regions 406a-406c, respectively.

Generally, the artifact regions 402 represents discrete portions of each digital page of the digital document 114 that the document analysis system 102 determines includes a page artifact 124. Each artifact region 402 can be defined in various ways, such as based on page coordinates (e.g., pixel coordinates), box size, relative proportion of a respective digital page, and so forth.

FIG. 5 depicts a scenario 500 for generating and displaying a reflowed document. The scenario 500, for instance, represents a continuation of the scenarios 300, 400. In the scenario 500, after identifying the page artifacts 124 of the digital document 114, the document analysis system 102 removes the page artifacts 124 from the digital document 114 and reflows the primary content 122 to generate the reflowed document 140. The reflowed document 140 is then displayed on the display device 116 of the client device 104.

As illustrated, the reflowed document 140 does not include the headers 126 and the footers 128. Further, the primary content 122 is reflowed (e.g., rearranged) to account for the removed artifacts, e.g., to fill in empty spaces in the digital document 114 created by removing the page artifacts 124. For instance, reflowing the primary content 122 involves moving the primary content 302a-302c adjacent one another in the reflowed document 140. Further, other primary content 502 from the digital document 114 is also reflowed and displayed after the primary content 302a-302c.

In at least one implementation, a revert control 504 is displayed along with the reflowed document 140 that is selectable to present the original digital document 114 in place of the reflowed document 140. For instance, selecting the revert control 504 causes the digital document 114 to be displayed instead of the reflowed document 140, such as depicted in the scenario 300. Thus, techniques described herein enable users to dynamically transition back and forth between digital document 114 with page artifacts 124 displayed, and reflowed documents 140 with the page artifacts 124 removed. The revert control 502 and the process control 308, for instance, can be selected to toggle back and forth between the original digital document 114 and the reflowed document 140.

Figure 6:
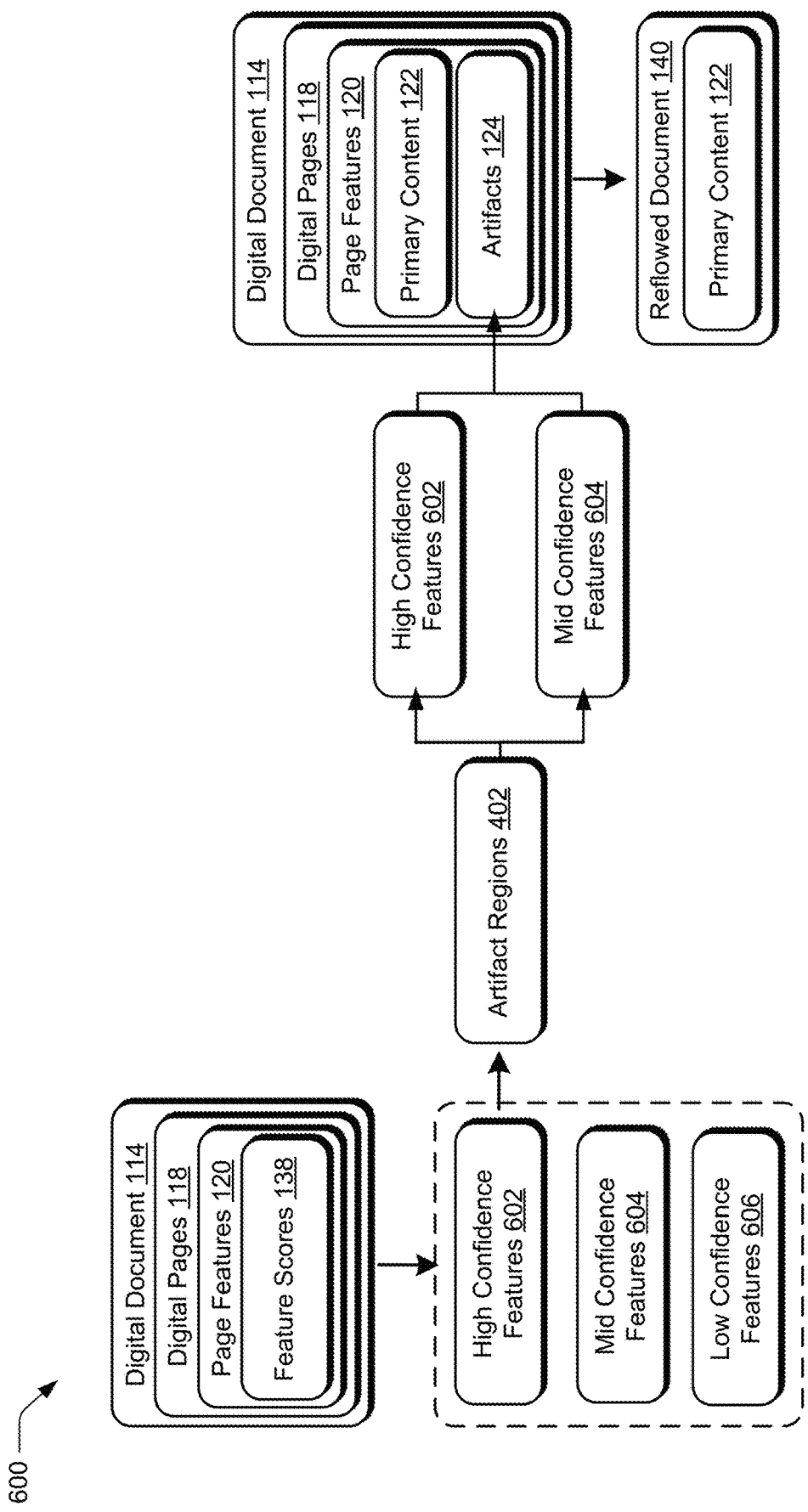
FIG. 6 depicts a system that details artifact identification for generating a reflowed document.

FIG. 6 depicts a system 600 that details artifact identification for generating a reflowed document. In the system 600, the page features 120 of the digital pages 118 are input to the feature analysis model 132, which generates a feature score 138 for each of the page features 120. Generally, the page features 120 include various features such as primary content 122 and page artifacts 124 that are at this point not classified or labeled in the digital document 114. Based on the feature scores 138, the classification module 134 classifies the page features 120 into high confidence features 602, mid confidence features 604, and low confidence features 606. In at least one implementation, this classification is based on different feature score thresholds.

For instance, an upper feature score threshold ("upper threshold") is defined such that page features 120 with feature scores above the upper threshold are categorized as the high confidence features 602. The high confidence features 602, for instance, represent page features 120 that are most likely to represent artifacts. A lower feature score threshold ("lower threshold") is also defined such that page features 120 with feature scores higher than the lower threshold but lower than the upper threshold are categorized as mid confidence features 604. Page features 120 with feature scores below the lower threshold are categorized as the low confidence features 606. In a non-limiting example, the upper threshold is defined as a feature score of 0.85, and the lower threshold is defined as a feature score of 0.1. These thresholds are provided as examples only, and other threshold values may be utilized within the scope of the described implementations.

Utilizing the high confidence features 602, the classification module 134 defines the artifact regions 402 on the digital pages 118. Generally, the artifact regions 402 represent discrete portions of the digital pages 118 that are most likely to include an artifact. For instance, since the high confidence features 602 are the most likely candidates from the page features 120 to represent artifacts, the location of the high confidence features 602 on the digital pages 118 are designated as the artifact regions 402. As referenced previously, the artifact regions 402 can be defined in various ways to indicate a relative position and size of the artifact regions 402 on specific instances of the digital pages 118.

In at least some implementations, in addition to considering the location of the high confidence features 602, the classification module utilizes a set of one or more heuristics to ascertain whether the location of a high confidence feature 602 is to be designated as an artifact region 402. Examples of these heuristics include:

1. Are there sufficient pages having dense artifact-probability regions? "Sufficient" can be defined in different ways, such as by defining a threshold number of pages that include a candidate artifact region. For instance—
   a. For high confidence features 602 in a particular digital document 114 that represent text, a threshold number of pages that include the text at a candidate artifact region can be defined based on a total number of pages of the digital document. For instance, the threshold number of pages may be proportional to the total number of pages, e.g., the threshold number of pages may be higher for digital documents with more total pages, and lower for digital documents with fewer total pages. Non-limiting examples of such thresholds include:
      i. 4 pages for digital documents≥10 pages;
      ii. 1 page for digital documents≤3 pages.
   b. For high confidence features 602 in a particular digital document 114 that represent images, a threshold percentage of pages that include the image at a candidate artifact region can be defined. For instance, in a non-limiting example, a threshold of 60% of pages of a digital document are to include the image at a same location on a respective page.
2. Are the candidate artifact regions different for odd and even pages? If yes, then the artifact regions 402 are to be defined as different regions for odd and even pages, respectively.
3. Is this a small document, e.g., less than 4 pages? If yes, then in at least some implementations, the heuristics don't consider the notion of different even and odd pages.
4. For high confidence features 602 in a particular digital document 114 that represent images and that include a horizontal line, the horizontal line is to span at least h % of a width of a respective digital page Q. In a non-limiting example, h=70.

Based on the artifact regions 402, the classification module 134 processes the digital pages 118 and the page features 120 to identify high confidence features 602 and mid confidence features 604 that reside within the artifact regions 402, and labels these features as page artifacts 124. For instance, the classification module 134 compares page position information (e.g., page coordinates) for each of the high confidence features 602 and mid confidence features 604 to position information for the artifact regions 402, and those features that reside within the artifact regions 402 are labeled as artifacts. In at least one implementation, the low confidence features 606 are omitted and are thus not considered in identifying artifacts.

Continuing, the presentation module 136 processes the digital document to discard the page artifacts 124 and reflow the digital document 114 to generate the reflowed document 140. As illustrated, the reflowed document 140 includes the primary content 122 without the page artifacts 124. Further, the primary content 122 may be reformatted and/or rearranged to account for the removed page artifacts 124, such as discussed previously.

Having discussed example details of the techniques for identifying artifacts in digital documents, consider now some example procedures to illustrate additional aspects of the techniques.

Example Procedures

This section describes example procedures for identifying artifacts in digital documents in one or more implementations. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. In at least some implementations the procedures are performed by a suitably configured device, such as the document analysis system 102 of FIG. 1 that makes use of the analysis manager module 108 and using aspects described in the scenarios above.

Figure 7:
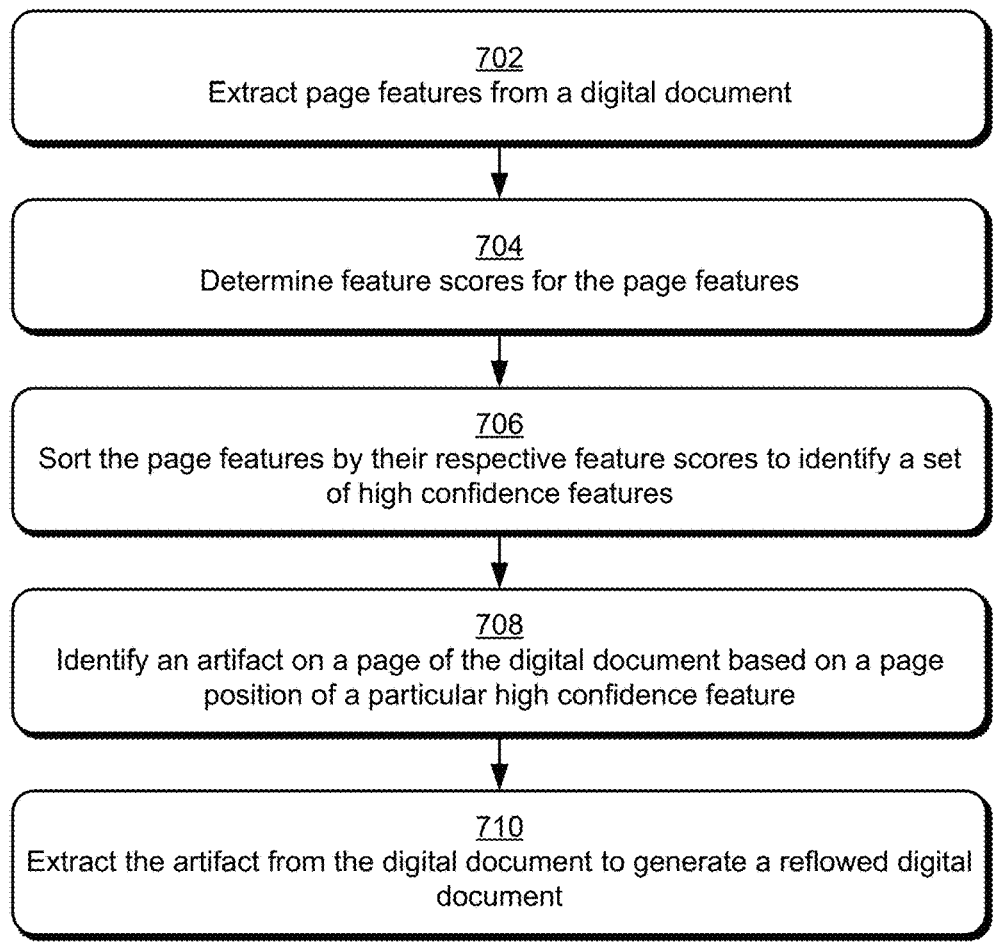
FIG. 7 depicts an example procedure for generating a reflowed version of a digital document.

FIG. 7 depicts an example procedure 700 for generating a reflowed version of a digital document. Step 702 extracts page features from a digital document. The feature extraction module 130, for instance, utilizes computer vision techniques to analyze a digital document to differentiate different structural features of the digital document. In at least one implementation, the digital document represents an image-based digital document (e.g., a PDF) without machine-encoded text or other machine-encoded content. In such implementations, the digital document may be processed via optical character recognition (OCR) as part of extracting its structural features. Further, extracting structural features can include specifying various attributes of the structural features, such as pixel coordinates of the structural features (e.g., relative to a page of the digital document), a bounding box size for the structural features, vector representations of the structural features, as well as various visual attributes of the structural features, such as images, text, and so forth.

Step 704 determines feature scores for the page features. Generally, each feature score indicates a likelihood that a respective page feature represents an artifact on a page of the digital document. The analysis manager module 108, for instance, inputs the extracted page features (e.g., their vector representations) into the feature analysis model 132. The feature analysis model 132 then processes each page feature and outputs a feature score for each page feature.

Step 706 sorts the page features by their respective feature scores to identify a set of high confidence features. Generally, the high confidence features represent page features most likely to correspond to the artifact of the digital document. The classification module 134, for instance, sorts different page features 120 based on their respective feature scores into different buckets based on different artifact likelihood thresholds. For instance, the high confidence features 602 are sorted into a first bucket based on their feature scores exceed a first artifact likelihood threshold. The mid confidence features 604 are sorted into a second bucket based on their feature scores being between the first artifact likelihood threshold and a second, lower artifact likelihood threshold. Finally, the low confidence features 606 are sorted into a third bucket based on their feature scores being below the second artifact likelihood threshold.

Step 708 identifies the artifact on at least one page of the digital document by determining that a page position of the artifact on the page coincides with an artifact region defined based on a page position of a particular high confidence feature. The classification module 134, for instance, defines an artifact region of the digital document based on a position of a particular high confidence feature 602. The classification module 134 then processes the digital document to identify other page features with page positions that coincide with the artifact region, and labels the identified page features as artifacts. As detailed elsewhere, defining the artifact region may include other heuristics in addition to page positions of page features.

Step 710 extracts the artifact from the digital document to generate a reflowed digital document. The presentation module 136, for example, removes the artifact from the digital document but leaves the primary content in the digital document to generate the reflowed document. In at least one implementation, the presentation module 136 rearranges the primary content, such as to fill gaps created by removal of the artifact.

Figure 8:
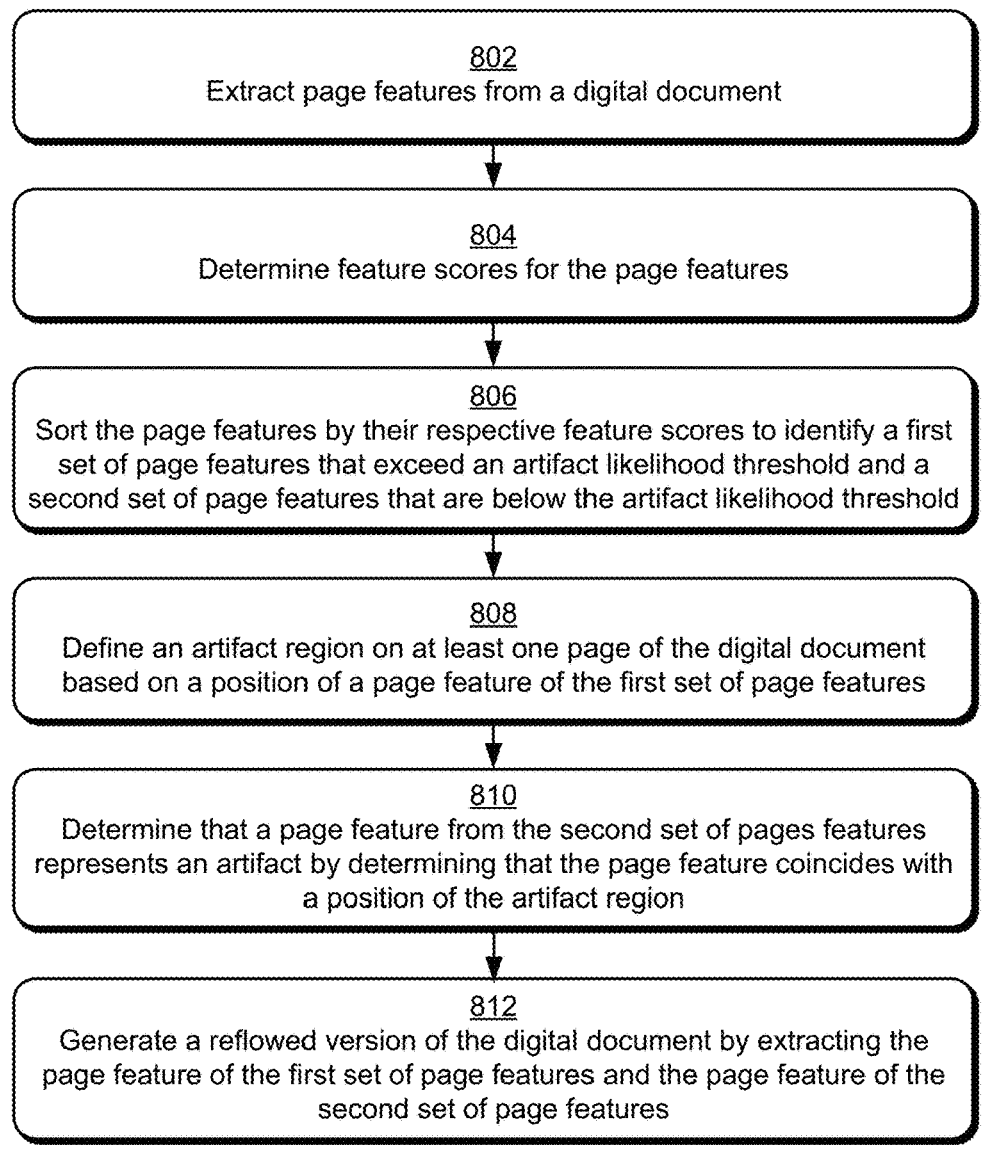
FIG. 8 depicts an example procedure for generating a reflowed version of a digital document by extracting artifacts from a particular portion of the digital document.

FIG. 8 depicts an example procedure 800 for generating a reflowed version of a digital document by extracting artifacts from a particular portion of the digital document. Step 802 extracts page features from a digital document. The feature extraction module 130, for instance, utilizes computer vision techniques to analyze a digital document to characterize page features of the digital document.

Step 804 determines feature scores for page features of the digital document. For instance, as described above, the feature analysis model 132 processes the page features and outputs a feature score for individual page features.

Step 806 sorts the page features by their respective feature scores to identify a first set of page features that exceed an artifact likelihood threshold, and a second set of page features that are below the artifact likelihood threshold. For example, the classification module 134 sorts the page features into different buckets based on their respective feature scores, such as the high confidence features 602, the mid confidence features 604, and the low confidence features 606. The first set of page features, for instance, represents the high confidence features 602, and the second set of page features represents the mid confidence features 604.

Step 808 defines an artifact region on at least one page of the digital document based on a position of a page feature of the first set of page features. The classification module 134, for example, determines a page position of a particular high confidence feature 602, and defines an artifact region on pages of the digital document based on the page position. In at least some implementations, defining the artifact region may also be based on other criteria, such as the high confidence feature being found at the same or similar position on a threshold number and/or percentage of pages of the digital document. Examples of other applicable heuristics are discussed above with reference to the system 600. Thus, those page features from the first set of page features that satisfy the heuristic criteria can be labeled as artifacts.

Step 810 determines that a page feature from the second set of pages features represents an artifact by determining that a position of the page feature from the second set of page features coincides with a position of the artifact region. The classification module 134, for example, processes the second set of page features to identify those page features that are positionally located within the artifact region. The classification module 134 then labels the identified page features as artifacts.

Step 812 generates a reflowed version of the digital document by extracting the page feature of the first set of page features and the page feature of the second set of page features and preserving primary content of the digital document. The presentation module 136, for instance, removes the page features labeled as artifacts from the digital document 114 to generate a reflowed document 140 that includes the primary content 122. Further, the primary content 122 may be rearranged account for the removed page features, e.g., to fill in empty gaps created by removal of the artifacts.

Figure 9:
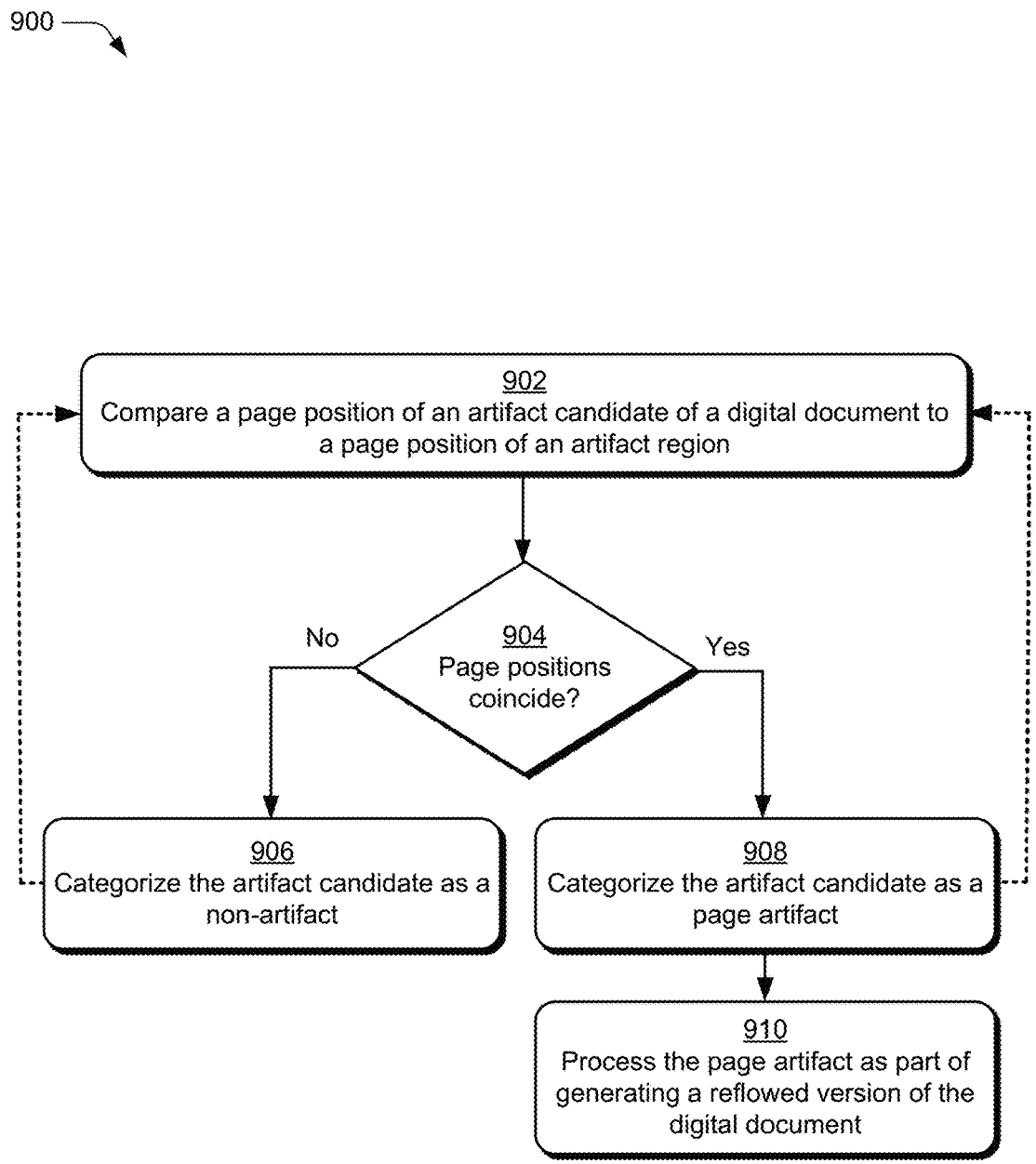
FIG. 9 depicts an example procedure for identifying page features that represent artifacts.

FIG. 9 depicts an example procedure for identifying page features that represent artifacts. The procedure, for instance, is performed in conjunction with the procedures and scenarios discussed above. For example, the procedure represents an example way of performing aspects of step 810 of the procedure 800 detailed above.

Step 902 compares a page position of an artifact candidate of a digital document to a page position of an artifact region. The artifact candidate, for instance, represents a page feature that meets a particular threshold feature score, such as a high confidence feature 602 and a mid confidence feature 604. In at least one implementation, the classification module 134 determines whether position coordinates for the artifact candidate (e.g., x/y coordinates on a particular digital page 118) overlap with page coordinates for a defined artifact region 402.

Step 904 determines whether the page positions coincide. If the page position of the artifact candidate does not coincide with an artifact region ("No"), step 906 categorizes the artifact candidate as a non-artifact. The classification module 134, for instance, labels the artifact candidate as a non-artifact. In at least one implementation, this can include labeling the artifact candidate as a different page feature type, such as primary content such that the page feature is preserved with a digital document is reflowed. The procedure may then return to step 902 to continue processing other artifact candidates of the digital document.

If the page position of the artifact candidate coincides with an artifact region ("Yes"), step 908 categorizes the artifact candidate as a page artifact. The classification module 134, for example, determines that a page position of the artifact candidate overlaps with an artifact region 402, and thus labels the artifact candidate as a page artifact 124. The procedure may then return to step 902 to continue processing other artifact candidates.

Step 910 processes the page artifact as part of generating a reflowed version of the digital document. The presentation module 136, for instance, discards the page artifact as part of generating a reflowed document 140.

Accordingly, technique described herein enable artifacts in digital documents to be automatically and accurately identified and labeled, such as to enable the artifacts to be removed to generate reflowed version of digital documents.

Having described example procedures in accordance with one or more implementations, consider now an example system and device that can be utilized to implement the various techniques described herein.

Example System and Device

Figure 10:
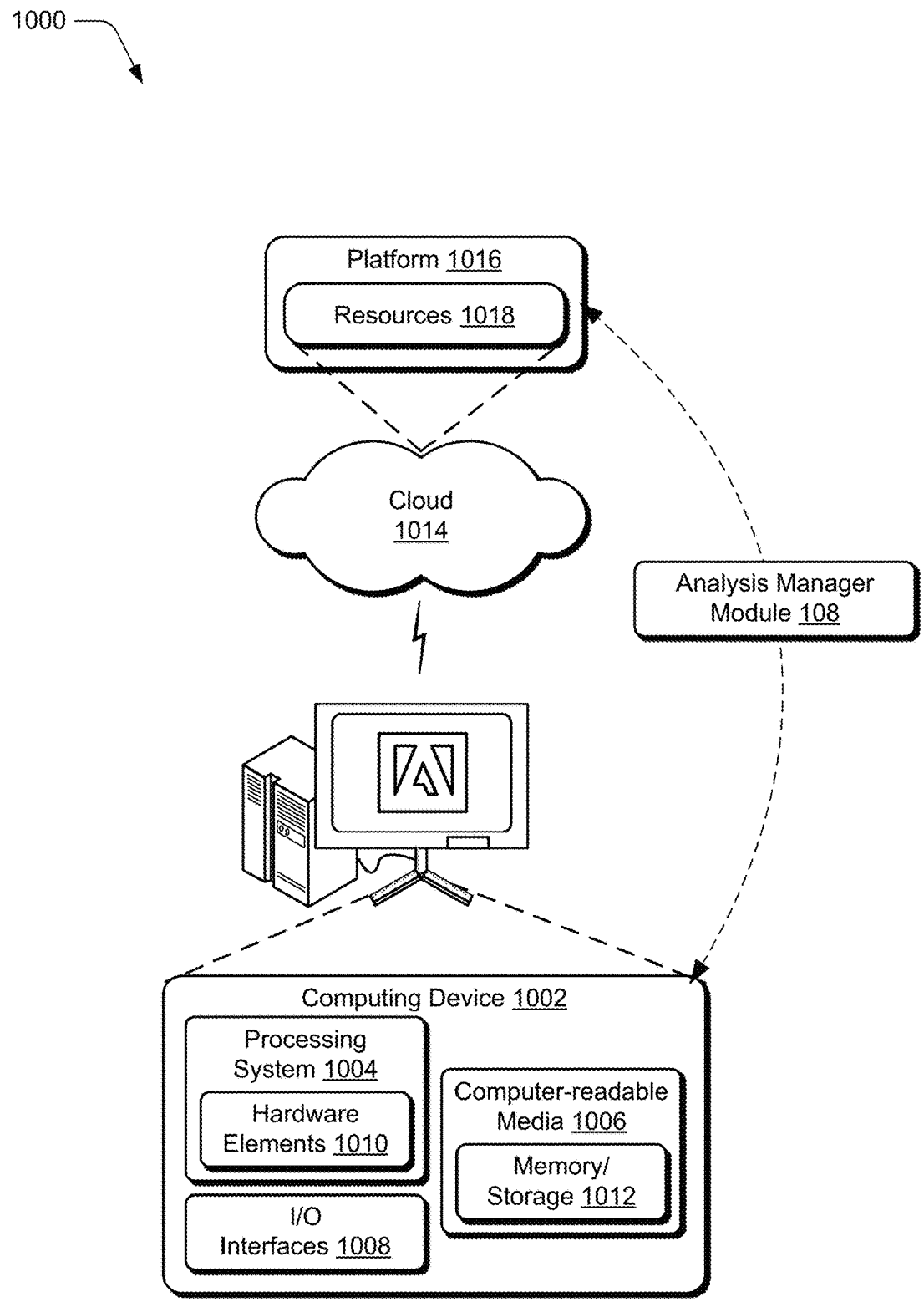
FIG. 10 illustrates an example system including various components of an example device that can be implemented as any type of computing device as described and/or utilized with reference to FIGS. 1-9 to implement aspects of the techniques described herein.

FIG. 10 illustrates an example system generally at 1000 that includes an example computing device 1002 that is representative of one or more computing systems and/or devices that may implement the various techniques described herein. This is illustrated through inclusion of the analysis manager module 108. The computing device 1002 may be, for example, a server of a service provider, a device associated with a client (e.g., a client device), an on-chip system, and/or any other suitable computing device or computing system.

The example computing device 1002 as illustrated includes a processing system 1004, one or more computer-readable media 1006, and one or more I/O interfaces 1008 that are communicatively coupled, one to another. Although not shown, the computing device 1002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware elements 1010 that may be configured as processors, functional blocks, and so forth. This may include implementation in hardware as an application specific integrated circuit or other logic device formed using one or more semiconductors. The hardware elements 1010 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1006 is illustrated as including memory/storage 1012. The memory/storage 1012 represents memory/storage capacity associated with one or more computer-readable media. The memory/storage component 1012 may include volatile media (such as random access memory (RAM)) and/or nonvolatile media (such as read only memory (ROM), Flash memory, optical disks, magnetic disks, and so forth). The memory/storage component 1012 may include fixed media (e.g., RAM, ROM, a fixed hard drive, and so on) as well as removable media (e.g., Flash memory, a removable hard drive, an optical disc, and so forth). The computer-readable media 1006 may be configured in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1002 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1002. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Computer-readable storage media do not include signals per se or transitory signals. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1002, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1010. The computing device 1002 may be configured to implement particular instructions and/or functions corresponding to the software and/or hardware modules. Accordingly, implementation of a module that is executable by the computing device 1002 as software may be achieved at least partially in hardware, e.g., through use of computer-readable storage media and/or hardware elements 1010 of the processing system 1004. The instructions and/or functions may be executable/operable by one or more articles of manufacture (for example, one or more computing devices 1002 and/or processing systems 1004) to implement techniques, modules, and examples described herein.

The techniques described herein may be supported by various configurations of the computing device 1002 and are not limited to the specific examples of the techniques described herein. This functionality may also be implemented all or in part through use of a distributed system, such as over a "cloud" 1014 via a platform 1016 as described below.

The cloud 1014 includes and/or is representative of a platform 1016 for resources 1018. The platform 1016 abstracts underlying functionality of hardware (e.g., servers) and software resources of the cloud 1014. The resources 1018 may include applications and/or data that can be utilized while computer processing is executed on servers that are remote from the computing device 1002. Resources 1018 can also include services provided over the Internet and/or through a subscriber network, such as a cellular or Wi-Fi network.

The platform 1016 may abstract resources and functions to connect the computing device 1002 with other computing devices. The platform 1016 may also serve to abstract scaling of resources to provide a corresponding level of scale to encountered demand for the resources 1018 that are implemented via the platform 1016. Accordingly, in an interconnected device embodiment, implementation of functionality described herein may be distributed throughout the system 1000. For example, the functionality may be implemented in part on the computing device 1002 as well as via the platform 1016 that abstracts the functionality of the cloud 1014.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:
1. A system for generating a reflowed digital document, the system comprising:
   one or more processors; and
   one or more computer-readable storage media storing instructions that are executable by the one or more processors to perform operations including:
      extracting page features from pages of the digital document, the page features including a first content type and a second content type;
      determining feature scores for the page features, each feature score indicating a likelihood that a respective page feature represents the second content type on a page of the digital document;
      sorting the page features by applying their respective feature scores to a first likelihood threshold and a second likelihood threshold to identify:
         a set of high confidence features with feature scores above the first likelihood threshold that include a first page feature most likely to correspond to the second content type of the digital document;

set of mid confidence features that include a second page feature with a feature score between the first threshold and the second threshold; and a set of low confidence features that include a third page feature with a feature score lower than the second threshold;

defining an artifact region of one or more pages of the digital document based on a page position of the first page feature;

determining that a page position of the second page feature spatially coincides with the defined artifact region on at least one page of the digital document and identifying the second page feature as the second content type; and extracting the first page feature and the second page feature from the digital document to generate the reflowed digital document that includes the first content type.

2. A system as described in claim 1, wherein said determining the feature scores comprises inputting the page features into a machine learning model, and receiving the feature scores as output from the machine learning model.

3. A system as described in claim 1, wherein said operations further include disregarding the third page feature as part of identifying the second content type of the digital document.

4. A system as described in claim 1, wherein the operations further include defining the artifact region based on determining that the digital document includes a threshold number of pages with an instance of the second content type located at the artifact region.

5. A system as described in claim 1, wherein the operations further include defining the artifact region based on determining that the artifact region includes an instance of the second content type that spans more than a threshold amount of a width of a page of the digital document.

6. A system as described in claim 1, wherein the second page feature comprises at least one of a header or a footer of the digital document, and wherein the operations further include reflowing the digital document to generate the reflowed document by repositioning the primary content to account for the extracted second page feature.

7. A system as described in claim 1, wherein the instructions are executable by the one or more processors to perform the operations in response to receiving a selection of a selectable control displayed along with the digital document.

8. A system as described in claim 7, wherein the selectable control is selectable to toggle back and forth between the digital document and the reflowed document.

9. A method implemented by at least one computing device for generating a reflowed version of a digital document, the method comprising:

determining, by the at least one computing device, feature scores for page features of the digital document, the page features including a first content type and a second content type, and each feature score indicating a likelihood that a respective page feature represents the second content type of the digital document;

sorting, by the at least one computing device, the page features by applying their respective feature scores to a first likelihood threshold and a second likelihood threshold to identify a first set of page features with feature scores that exceed the first likelihood threshold, a second set of page features with feature scores between the first likelihood threshold and the second likelihood threshold, and a third set of page features with feature scores that are below the second likelihood threshold;

defining, by the at least one computing device, an artifact region on at least one page of the digital document based on a position of a page feature of the first set of page features;

determining, by the at least one computing device, that a page feature from the second set of pages features represents the second content type by determining that a position of the page feature from the second set of page features spatially coincides with a position of the artifact region; and generating, by the at least one computing device, a reflowed version of the digital document by extracting the page feature of the first set of page features and the page feature of the second set of page features and preserving the first content type of the digital document.

10. A method as described in claim 9, wherein the third set of page features is disregarded for identifying instances of the second content type of the digital document.

11. A method as described in claim 9, wherein said defining the artifact region is further based on determining that the page feature of the first set of page features spans more than a threshold amount of a width of a page of the digital document.

12. A method as described in claim 9, wherein the page feature from the second set of page features comprises at least one of a header or a footer of the digital document.

13. A method as described in claim 9, wherein said defining the artifact region is further based on determining, by the at least one computing device, that the page feature of the first set of page feature occurs on one or more of a threshold number of pages of the digital document, or a threshold percentage of pages of the digital document.

14. A method as described in claim 9, wherein said generating further comprises rearranging, by the at least one computing device, the first content type to account for the extracted page features.

15. A method implemented by at least one computing device for generating a reflowed version of a digital document, the method comprising:

extracting page features from pages of the digital document, the page features including a first content type and a second content type;

determining feature scores for the page features, each feature score indicating a likelihood that a respective page feature represents the second content type on a page of the digital document;

sorting the page features by applying their respective feature scores to a first likelihood threshold and a second likelihood threshold to identify:

a set of high confidence features with feature scores above the first likelihood threshold that include a first page feature most likely to correspond to the second content type of the digital document;

set of mid confidence features that include a second page feature with a feature score between the first threshold and the second threshold; and a set of low confidence features that include a third page feature with a feature score lower than the second threshold;

defining an artifact region of one or more pages of the digital document based on a page position of the first page feature;

determining that a page position of the second page feature spatially coincides with the defined artifact region on at least one page of the digital document and identifying the second page feature as the second content type; and extracting the first page feature and the second page feature from the digital document to generate the reflowed digital document that includes the first content type.

16. A method as described in claim 15, wherein said determining the feature scores comprises inputting the page features into a machine learning model and receiving the feature scores as output from the machine learning model.

17. A method as described in claim 15, further comprising defining the artifact region based on determining that the digital document includes a threshold number of pages with an instance of the second content type located at the artifact region.

18. A method as described in claim 15, further comprising defining the artifact region based on determining that the artifact region includes an instance of the second content type that spans more than a threshold amount of a width of a page of the digital document.

19. A method as described in claim 15, wherein the first page feature and the second page feature comprise one or more of headers or footers of the digital document.

20. A method as described in claim 15, further comprising, after extracting the first page feature and the second page feature from the digital document, moving instances of the first content type adjacent one another to generate the reflowed digital document.

\* \* \* \* \*